Dec. 18, 1928.  
J. MOORES  
1,696,099  
CAKE FORMING AND DEPOSITING MACHINE  
Filed Feb. 21, 1920 4 Sheets-Sheet 1
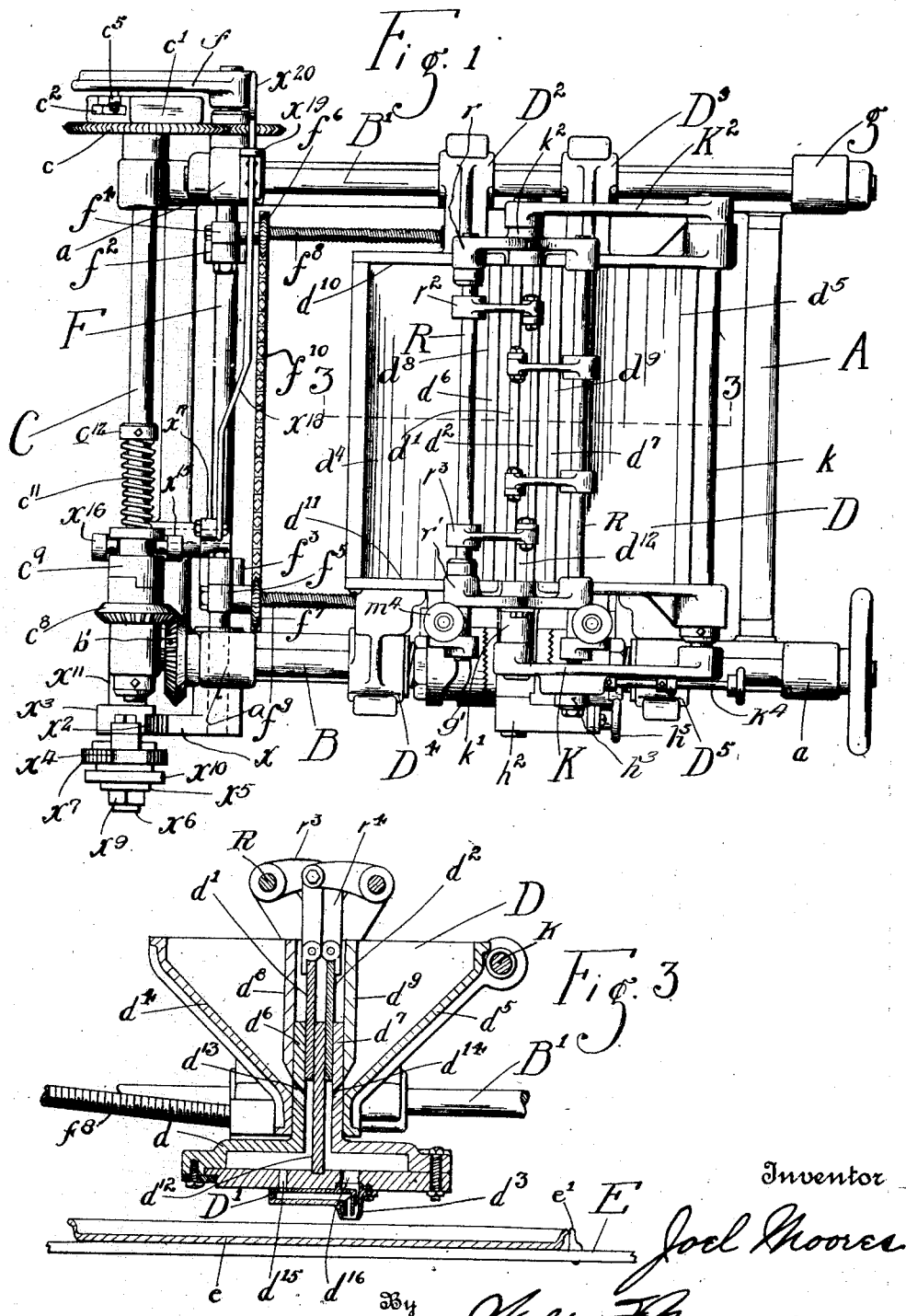

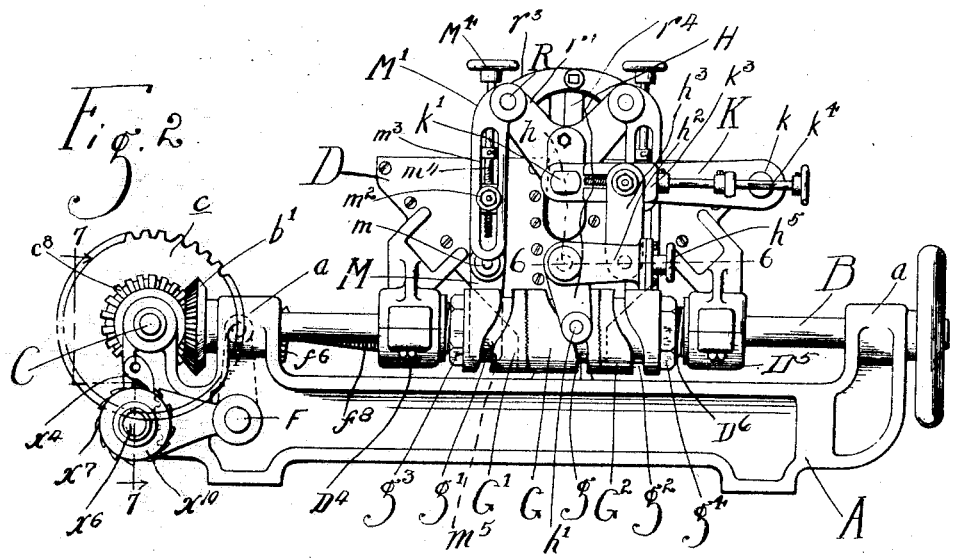
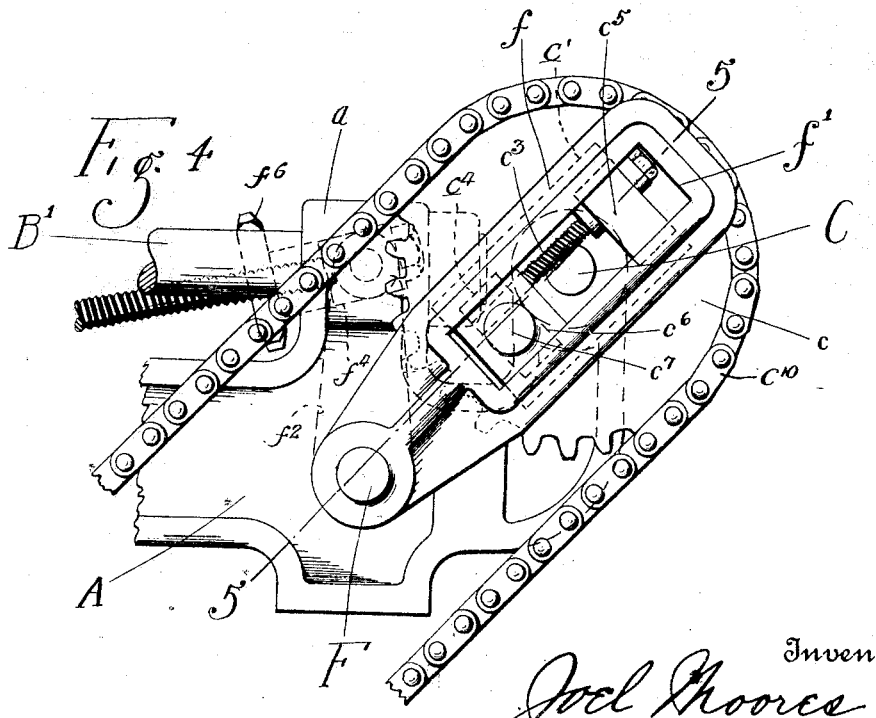

Dec. 18, 1928.
J. MOORES
1,696,099

CAKE FORMING AND DEPOSITING MACHINE

Filed Feb. 21, 1920 4 Sheets-Sheet 3

Inventor
Joel Moores
By Walter F. Murray
Attorney

Dec. 18, 1928.

J. MOORES 1,696,099

CAKE FORMING AND DEPOSITING MACHINE

Filed Feb. 21, 1920    4 Sheets-Sheet 4

Joel Moores, Inventor
By Walter F. Murray, Attorney

Patented Dec. 18, 1928.

1,696,099

UNITED STATES PATENT OFFICE.

JOEL MOORES, OF NORWOOD, OHIO, ASSIGNOR TO THE J. H. DAY COMPANY, OF CINCINNATI, OHIO, A CORPORATION OF OHIO.

CAKE FORMING AND DEPOSITING MACHINE.

Application filed February 21, 1920. Serial No. 360,536.

My invention relates to a machine, which draws charges of dough from a batch thereof contained in a hopper into a die or former, shapes the pieces and deposits them upon a pan, which is fed beneath the hopper.

In machines of this class, it has been customary to have the hopper stationary and to have the pan fed intermittently beneath the hopper, from which the pieces of dough were fed onto the pan, whilst it was held stationary.

The intermittent feed of the pan occasioned a considerable loss of time in the operation of the machine, and a consequent decrease in the output of the machine.

It is the object of my invention to increase the output of cake forming and depositing machines.

This object is attained by providing means for feeding the pan continuously, means for having the hopper move forward with the pan during the depositing of a row of cakes upon the pan, means for moving the hopper backward to space the next row of cakes from that previously deposited, and means during the backward movement of the hopper for drawing the pieces of dough from the batch into the dies.

In the accompanying drawings which illustrate a preferred embodiment of my invention:

Fig. 1, is a plan view of a machine embodying my invention.

Fig. 2, is a side elevation of part of the machine shown in Fig. 1.

Fig. 3, is a sectional view taken on line 3—3 of Fig. 1.

Fig. 4, is an enlarged elevation of the driving mechanism.

Figure 5:
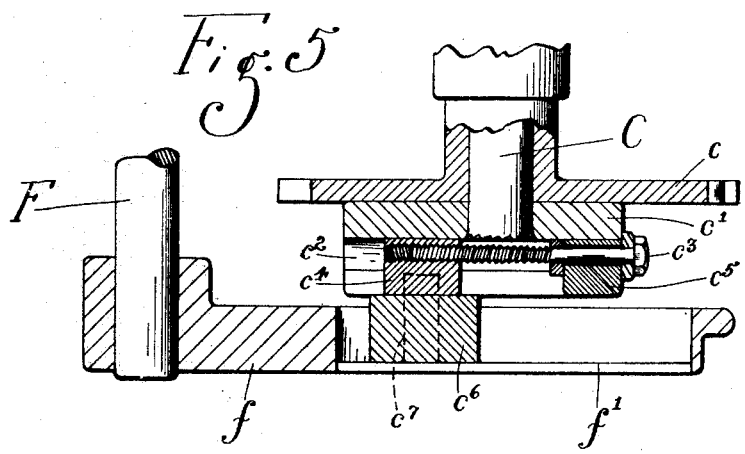
Fig. 5, is a sectional view taken upon line 5—5 of Fig. 4.
Figure 6:
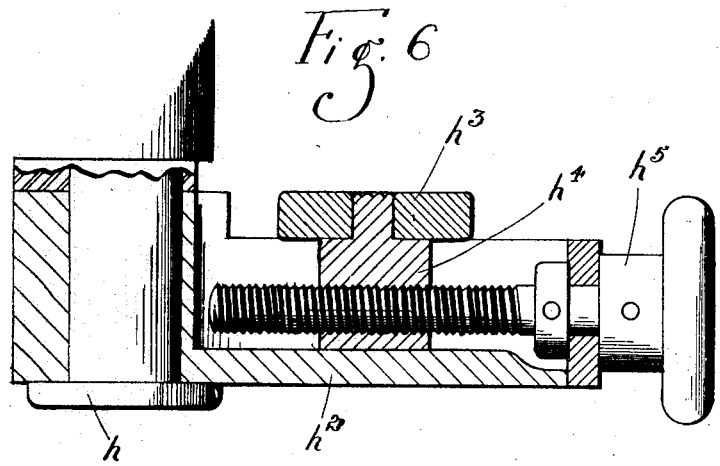
Fig. 6 is a sectional view taken upon line 6—6 of Fig. 2.
Figure 7:
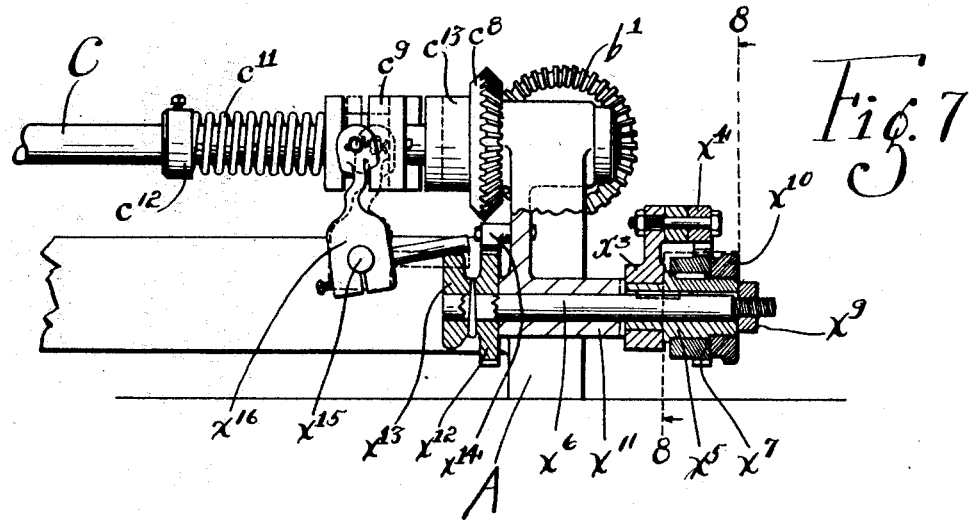
Fig. 7, is an enlarged sectional view on line 7—7 of Fig. 2.
Figure 8:
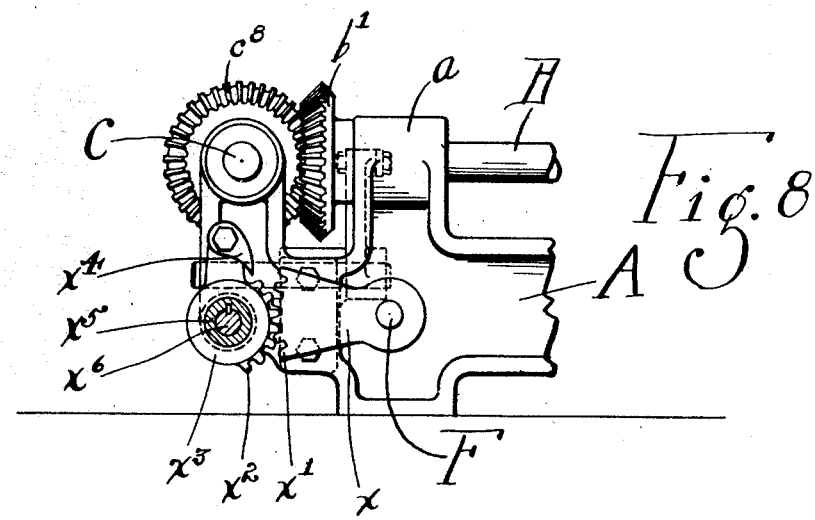
Fig. 8 is a sectional view on line 8—8 of Fig. 7.

My invention comprises a frame A mounted above an endless belt E. Frame A has journal bearings $a$ in which are revolvably mounted shafts B and B'. Upon the shafts is slidably mounted a dough hopper D. I provide means for imparting a reciprocatory motion to hopper D from the driving shaft C.

Hopper D is adapted to hold a batch of dough and has a die $d$ communicating with it into which pieces of dough are drawn from the batch of dough in the hopper, by plungers $d'$, $d^2$, upon their upward movement. These plungers upon their downward movement force the dough from the die thru the mouth of the discharge pipe $d^3$ upon the pan $c$, which is carried by the endless belt E. I provide means for raising the die $d$ and the plungers $d'$, $d^2$ upon the backward movement of the hopper, and for lowering the die to a point adjacent to the pan and of lowering the plungers $d'$, $d^2$ upon the forward movement of the hopper, and for causing the forward movement of the hopper to have substantially the same rate of speed as that of the belt E, so that during the depositing operation, whilst the hopper and the pan are moving relatively to the fixed parts of the machine, there is no substantial relative movement during the depositing operation between the hopper and the pan.

I will now describe in detail first the construction of the hopper, the die and the plungers, and then describe the construction of the operative mechanism.

The bottom of the hopper D is formed by converging sides $d^4$, $d^5$, between the converging sides of which is formed a transverse channel, the walls of which contact with the vertical walls $d^6$, $d^7$ of the die $d$, which is adapted to have a vertical reciprocation between the walls of said channel and between the transverse vertical walls $d^8$ and $d^9$, which divide the hopper into two compartments and extend from the end $d^{10}$ to the end $d^{11}$ of the hopper. Die $d$ is divided into two compartments by a central transverse wall $d^{12}$, between which and the walls $d^6$, $d^7$ the plungers $d'$, $d^2$ are adapted to reciprocate. Walls $d^6$, $d^7$ have in them slots $d^{13}$, $d^{14}$, which in the raised position of the die $d$, register with the inner surface of the sides $d^4$, $d^5$ of the bottom of the hopper, and in the lower position of the die are closed by the side walls of the channel in the bottom of the hopper. The movement of the plungers $d'$, $d^2$ and of the die $d$, are timed so that the slots $d^{13}$, $d^{14}$ are opened by the raising of the die, at the same time that the plungers $d'$, $d^2$ are raised so as to draw dough into the compartments of the die, and upon the downward movement of the die and the plungers to close the slots $d^{13}$, $d^{14}$ before the plungers descend and to keep them closed while the plungers are descending so as to force a charge of dough from the compartment.

Discharge tube D' communicates thru ports $d^{15}$, $d^{16}$ with the respective compartments of the die.

The purpose of having the two compartments of the die, is to provide means for making the charge of dough to consist of two colors or of two varieties of materials, if it be desired.

I will now describe the means for actuating the parts heretofore described, from the main driving shaft C.

The hopper has secured to each of its sides journals $D^2$, $D^3$, $D^4$, $D^5$, which slide upon the shafts B, B'. The journals $D^4$ and $D^5$ carry stud bearings $D^6$ slidably engaging the shaft B. If desired a sleeve may be employed in lieu of the stud bearings and extend between the journals. The hopper is reciprocated by a rock shaft F, which has secured upon its end a yoke $f$, that imparts a rocking motion to the shaft, the extent of the motion being made adjustable by the following means. Drive shaft C has secured upon its end a driving pinion $c$ which may be driven by any ordinary and well known means such as chain $c^{10}$ and upon the outer face of which is a diametrically secured crank block $c'$ which has in it a dove-tailed way $c^2$ in which is secured a fixed block $c^5$ which is connected by an adjusting screw $c^3$ with a screw threaded block $c^4$ which is adjustably mounted in the way $c^2$ of the crank block $c'$ and which is connected with block $c^6$ by journal pin $c^7$; block $c^6$ engages way $f$; whereby a rocking movement is conveyed to shaft F from the drive shaft C, the degree of oscillation being capable of variation by adjusting the radial distance between the block $c^4$ and the axis of the driving shaft C. The rocking movement of shaft F is converted into a reciprocating movement of the hopper D by means of arms $f^2$, $f^3$ which are secured to the rock shaft F and carry at their upper ends blocks $f^4$, $f^5$ upon which are journalled internally screw-threaded sprocket wheels $f^6$, $f^7$ which engage screw-threaded arms $f^8$, $f^9$ which engage the journal bearing $D^2$, $D^4$ of the hopper. The sprocket wheels $f^6$, $f^7$, are connected by a sprocket chain $f^{10}$, whereby the arms $f^8$, $f^9$ may be manually rotated together when it is desired to change their length for adjusting the position of the hopper.

I will now describe the means for actuating the die and the plungers of the hopper.

Drive shaft C has a bevel pinion $c^8$ which may be fixed upon the drive shaft by means of a clutch $c^9$, and which engages a bevel pinion $b'$ which is secured upon the shaft B. Shaft B has splined upon it a sleeve $D^6$ extending between journals $D^4$ and $D^5$ to which sleeve is keyed the block G, which has in it a cam groove $g$. Mounted loosely upon the sleeve $D^6$ upon each side of the block G, are blocks G', $G^2$ which have in them cam grooves $g'$, $g^2$, respectively. In event that stud bearings are employed rather than a sleeve $D^6$, the block G would be splined to the shaft B, the blocks G' and $G^2$ would be mounted loosely upon the shaft B, and the ends of the stud bearings adjacent the blocks G' and $G^2$ would be threaded to provide seats for the nuts $g^3$ and $g^4$. The adjacent ends of the blocks G, G', $G^2$ have in them a series of radial serations by means of which the blocks G, G', $G^2$ may be secured in various adjustments relative to each other by means of the nuts $g^3$, $g^4$ mounted on the threaded ends of sleeve $D^6$ or stud bearings.

The cam groove $g$ imparts movement to the mechanism which imparts vertical reciprocation to the die, and the cam grooves $g'$, $g^2$ impart vertical reciprocation to the plungers $d'$, $d^2$ respectively by mechanisms now to be described.

A bell crank lever H is journalled upon a stud shaft $h$ carried by the end of the hopper, and has a roller $h'$ which engages the cam groove $g$ upon one of its arms, the other arm $h^2$ thereof being connected by a link $h^3$ with an arm K which at its outer end is journalled in a shaft $k$ which is mounted at one end of the hopper and at its opposite end is connected to a link $k'$ mounted on bracket $r'$ attached to the sides $d^6$, $d^7$ of the die $d$. A similar arm $K^2$ and link $k^2$ connect the opposite end of the shaft $k$ with the opposite end of the sides $d^6$, $d^7$ of the die. The means for varying the adjustment of these parts is as follows: Arm $h^2$ carries a sliding block $h^4$, the position of which upon the arm $h^2$ is regulated by a screw $h^5$. Arm K carries an adjustable block $k^3$ whose position upon the arm K may be regulated by screw $k^4$. Link $h^3$ is pivoted to the blocks $h^4$ and $k^3$ respectively.

The means by which motion is conveyed from the cam groove $g'$ to the block $d^2$ is similar to the means by which motion is conveyed from the cam groove $g^2$ to the plunger $d'$, and hence only one of these means need be specifically described.

Pivoted at $m$ upon the end of the hopper D, is an arm M, the lower end of which has a roller $m^5$ which engages the cam groove $g'$ and the upper end of which carries a pivot which engages a block $m^2$ located in a way $m^3$ in link M', which is secured upon the end of a rock shaft R which is journalled at its ends in brackets $r$, $r'$, which are fastened to the ends of the walls $d^6$, $d^7$, of the die $d$. The position of the block $m^2$ in the way $m^3$ may be varied by means of an adjusting screw $m^4$ carried at the upper end of the arm M. As the brackets $r$ and $r'$ are moved up and down, the block $m^2$ is reciprocated in the way $m^3$. Shaft R has secured to its links $r^2$, $r^3$, which are connected to the upper end of the plunger $d^2$ by means of links $r^4$. (See Fig. 3.) Continuous rotation may be imparted from the main shaft C to the conveyor E by any well known means. The conveyor has upon it a series of lugs $e'$ for abutting the end of the pan $e$ so as to carry it with the conveyor.

The shaft F has mounted on its end, opposite to that end on which the yoke $f$ is mounted, a segment $x$ to which an oscillatory motion is imparted. The segment carries teeth $x'$ engaging the teeth $x^2$ formed on the collar $x^3$ carrying the pawl $x^4$. The collar $x^3$ is revolubly mounted on the sleeve $x^5$ keyed to one end of the ratchet shaft $x^6$ disposed below and extending parallel with the shaft C. A ratchet $x^7$ is removably keyed upon the sleeve and is revolubly actuated by the pawl. The end of the shaft extending from the sleeve is screw threaded and has mounted on it a lock nut $x^9$. A lock nut $x^{10}$ is mounted on the sleeve to avoid separation of the ratchet wheel and sleeve. The ratchet shaft is revolubly mounted in the bearing $x^{11}$ formed in the frame A. The ends of the shaft $x^6$ extend from the ends of the bearings $x^{11}$. The second end of the shaft $x^6$ has fixed upon it the ratchet wheel $x^{12}$ carrying the cam $x^{13}$. A pawl $x^{14}$ is mounted on the frame A and engages the ratchet wheel $x^{12}$ and precludes movement of shaft $x^6$ in other than a given direction. From the foregoing it is apparent that the oscillating movement of the shaft F is converted into an intermittent motion of the ratchet shaft $x^6$ in a given direction. A trip shaft $x^{15}$, which may be a stud shaft, is mounted on the frame A and carries a bell crank lever $x^{16}$, the upper arm of which is bifurcated and engages the clutch member $c^9$, and the other arm of which lever rides upon the cam $x^{13}$. A spring $c^{11}$ mounted on the shaft C abuts the clutch member $c^9$ and the collar $c^{12}$ mounted on shaft C and normally retains the clutch members $c^9$ and $c^{13}$ in driving relation. Clutch member $c^9$ is splined upon the shaft C and member $c^{13}$ is formed on the bevel pinion $c^8$. From the foregoing it is apparent that the clutch members are alternately moved into and out of driving relation by the rotation of cam $x^{13}$. The teeth on the first mentioned ratchet wheel $x^7$ and the arc through which the segment $x$ moves, determines the number of times the hopper D is reciprocated before the clutch members are disengaged. In this manner provision is made to have the shaft B skip one of its movements at the time when two pan edges pass below the discharge pipe $d^3$. In cases where the pans $e$ are not passed under the hopper and the deposit from hopper is made upon the dough which is carried by the conveyor or belt E, the hopper skips one row of cake dough out of every given number of rows of cake dough. The reason this is desired is that ordinarily the dough carried by the belt E is in the form of a big flat sheet, the cakes having been cut from the sheet at the time the sheet passes below the hopper, but the dough from which the cakes have been cut has not been taken away from about the severed cakes of dough. When the conveyer E reaches its limit beyond the hopper, the cakes of dough carrying a deposit from the hopper are deposited upon pans passing below the end of conveyer E. The scrap or off fall of dough is rerolled into another sheet which is placed on conveyer E and cakes cut therefrom. The time necessary to change pans at the end of the belt E is just about sufficient to cause one row of cakes of dough to be fed to the end of the belt E. If this row of cakes had a deposit from hopper D placed thereupon, these dough cakes could not be mixed into mass of dough from which the sheet of dough is made, and would therefore be wasted. Therefore the mechanism just explained has been developed to avoid the placing of a deposit upon the row of cakes of dough that would feed between two pans at the end of belt E, thereby avoiding the wasting of such row of cakes of dough. Also secured on trip-shaft $x^{15}$ is a crank-arm $x^{17}$, to the upper end of which is attached an operating-rod $x^{18}$ which extends to one side of the machine and through a guide $x^{19}$ and is provided with a handle $x^{20}$, whereby the clutch member $c^9$ can be operated manually at any desired time.

The operation of the machine is as follows: A reciprocating motion is conveyed to the hopper from the pinion $c$ on to the main shaft C thru the block $c^4$, the yoke $f$, the shaft F, the arms $f^2$, $f^3$ and the arms $f^8$, $f^9$. Reciprocation of the hopper and of the movement of the conveyor E are timed so that in the forward movement of the hopper it moves in unison with the conveyor.

On the forward movement of the hopper a downward movement is imparted to the die $d$ so as to bring it in proximity to the pan $e$ upon the conveyor E, by the cam groove $g$, bell crank lever H, link $h^3$, arm K and links $k'$. In this downward movement the slots $d^{13}$ and $d^{14}$ are covered by the side walls of the channel in the bottom of the hopper D. Upon the forward movement of the hopper the cam grooves $g'$ and $g^2$ lower the plungers $d^2$, $d'$ thru the arms M, the links M', the shaft R and the arms $r^2$, $r^3$, so that a charge of dough from the compartments in the die is forced thru the openings $d^{15}$ and $d^{16}$ from the mouth $d^3$ onto the pan. Upon the return movement of the hopper the cam groove $g$, thru bell crank lever H and its connected mechanism, raises the die $d$ so as to uncover the slots $d^{13}$, $d^{14}$ and the cam groove $g'$, $g^2$, thru the arms M and their connected mechanism, raises the plungers $d^2$, $d'$ so as to draw from the batches of dough in the compartments of the hopper fresh charges of dough into the compartments of the die.

The blocks G, G' and $G^2$ may be revolubly adjusted in relation to one another for various purposes. The central block G controls the reciprocation of the die, and the end blocks G' and $G^2$ control the reciprocation of the plungers $d'$ and $d^2$. The block G is set to reciprocate the die $d$ in relation to the cakes on the conveyer E. On some occasions it may be desired to feed dough from the compartments in the die on the movement of the hopper in one direction, and in other cases on the movement of the hopper in the opposite direction. On other occasions it may be desired to feed dough first from one compartment in the die, and then feed dough from the other compartment. The blocks referred to permit these various relative movements of the die and plungers.

What I claim is:—

1. In a cake forming and depositing machine the combination of a hopper, a means for reciprocating the hopper, a conveyor adapted to be fed continuously beneath the hopper, the hopper having in its bottom a die adapted to be moved from an upper to a lower position and vice versa through the bottom of the hopper, the hopper having a port in its wall opened in the upper and closed in the lower position of the die, plungers adapted to draw a charge of dough from the hopper through the port into the die and to discharge the charge upon the pan, means adapted to raise the die and the plungers upon the backward movement of the hopper and to lower the die and the plungers upon the forward movement of the hopper.

2. In a machine of the character described the combination of a frame, guide shafts mounted in the frame, a hopper, guide collars mounted on the hopper slidably engaging the guide shafts, means for rotating one of the guide shafts, a dough feeding mechanism carried by the hopper and means actuated by the rotating guide shaft for operating the dough feeding mechanism.

3. In a machine of the character described the combination of a frame, longitudinal guide shafts mounted at opposite sides of the frame, a hopper slidably engaging the guide shafts, a main shaft and a rock shaft mounted in the frame, means for connecting the rock shaft with the main shaft, gears connecting the main shaft and one of the guide shafts, means connecting the rock shaft and the hopper and adapted to convey a reciprocating motion from the rock shaft to the hopper, mechanism adapted to feed dough from the hopper on the forward movement thereof and to be actuated from the rotating guide shaft.

4. In a machine of the character described the combination of a conveyor for pans a hopper above the conveyor, a die or cake forming means connected with said hopper, plungers cooperating with the die and adapted to feed charges of dough therefrom upon the pans, means for reciprocating the hopper longitudinally of the conveyor and adjustable means for actuating the plungers to vary the movement thereof, whereby the volume of the charge may be varied.

5. In a machine of the character described the combination of a conveyor for pans, a hopper above the conveyor, a die or cake forming means connected with said hopper and dividing it into a plurality of compartments, plungers cooperating with the die and adapted to feed separate charges of dough from the hopper, means for reciprocating the hopper and means for varying the operation of the plungers relatively to each other.

6. In a machine of the character described the combination of a frame, longitudinal guide shafts mounted at opposite sides of the frame, a hopper slidably engaging the guide shafts, a main shaft and a rock shaft mounted in the frame, means for connecting the rock shaft with the main shaft, gears connecting the main shaft and one of the guide shafts, means connecting the rock shaft and the hopper and adapted to convey a reciprocating motion from the rock shaft to the hopper, mechanism adapted to feed dough from the hopper on the forward movement thereof, and cams upon the rotating guide shaft controlling the dough feeding mechanism.

7. In a machine of the character described the combination of a frame, longitudinal guide shafts mounted at opposite sides of the frame, a hopper slidably engaging the guide shafts, a main shaft and a rock shaft mounted in the frame, means for connecting the rock shaft with the main shaft, gears connecting the main shaft and one of the guide shafts, means connecting the rock shaft and the hopper and adapted to convey a reciprocating motion from the rock shaft to the hopper, the hopper having in its bottom a vertically reciprocating die, a plunger adapted to draw charges of dough from the hopper into the die, means for mounting the plunger within the hopper, a cam upon the rotating guide shaft controlling the die, a cam upon the rotating guide shaft controlling the plunger and means for adjusting the cams relatively to each other.

8. In a machine of the class described, the combination of a conveyer, a hopper above the conveyer, means to reciprocate the hopper longitudinally in substantial unison with the conveyer, and means adapted to feed a charge from the hopper upon the conveyer during any portion of the hopper's cycle.

9. In a cake forming and depositing machine the combination of a hopper, means for reciprocating the hopper, a conveyer adapted to be fed continuously beneath the hopper, the hopper having in its bottom a die adapted to be moved from an upper to a lower position and vice versa through the bottom of the hopper and having a port in its walls opened in the upper and closed in the lower position of the die, plungers adapted to draw a charge of dough from the hopper through the port into the die and to discharge upon the pan, means adapted to actuate the die and the plungers, and means to vary the relative movements of the hopper, the die and the plungers.

10. In a cake forming and depositing machine the combination of a hopper, a means for reciprocating the hopper, a conveyer adapted to be fed continuously beneath the hopper, the hopper having in its bottom a die adapted to be moved from an upper to a lower position and vice versa through the bottom of the hopper and having a port in its walls opened in the upper and closed in the lower position of the die, plungers adapted to draw a charge of dough from the hopper through the port into the die and to discharge upon the pan, means adapted to raise the die and the plungers upon the backward movement of the hopper and to lower the die and the plungers upon the forward movement of the hopper, and means to render the die reciprocating means inoperative for a given period after a determinable number of deposits have been made from the hopper.

11. In a machine of the class described the combination of a conveyer, a hopper above the conveyer, means to reciprocate the hopper longitudinally of the conveyer, a die mounted reciprocally on the hopper, means to render the die reciprocating means inoperative for a given period after a determinable number of deposits have been made from the hopper.

12. In a machine of the class described the combination of a frame, guide shafts mounted on the frame, a hopper slidably mounted upon the guide shafts, a continuously moving conveyer passing beneath the hopper, means for feeding dough from the hopper to the conveyer, a drive shaft adapted to actuate the dough feeding means, a rock shaft operatively connected with the drive shaft adapted to reciprocate the hopper longitudinally of the frame, and a ratchet mechanism actuated by the rock shaft adapted to intermittently render the drive shaft inoperative upon the means for discharging from the hopper upon the conveyer.

13. A skip mechanism for a device having a hopper, from which charges of dough are fed in a given sequence, comprising a drive shaft, means on the drive shaft adapted to actuate the means operative upon the dough in the hopper, a rock shaft operatively connected with the drive shaft, a clutch on the drive shaft adapted to render the drive shaft inoperative upon the means operative upon the dough discharging means, a ratchet shaft, a collar mounted on the ratchet shaft and having a mutilated gear formed thereon, a segment on the rock shaft engaging the mutilated gear segment adapted to oscillate the collar, a ratchet mechanism mounted on the ratchet shaft adapted to transmit intermittent motion in a given direction from the collar to the ratchet shaft, and a cam mounted on the ratchet shaft controlling the clutch mounted on the drive shaft.

14. In a skip mechanism of the class described the combination of a drive shaft, a driven shaft, means adapted to transmit motion from the drive shaft to the driven shaft, means to render the drive shaft inoperative upon the driven shaft, a rock shaft operatively connected with the drive shaft, a segment mounted on the rock shaft, a ratchet shaft, a collar revolubly mounted upon the ratchet shaft and carrying a pawl, and a mutilated gear segment, the teeth on the collar engaging the segment on the rock shaft, a ratchet wheel mounted upon the ratchet shaft engaging the pawl adapted to transmit motion to said shaft, means mounted on the ratchet shaft adapted to preclude movement of the ratchet shaft in any but a given direction, and means actuated by the ratchet shaft controlling the means adapted to render the drive shaft inoperative upon the driven shaft.

15. In a skip mechanism of the class described the combination of a drive shaft, a driven shaft, means adapted to transmit motion from the drive shaft to the driven shaft, means to render the drive shaft inoperative upon the driven shaft, a rock shaft operatively connected with the drive shaft, a segment mounted on the rock shaft, a ratchet shaft, a collar revolubly mounted upon the ratchet shaft and carrying a pawl, and a mutilated gear segment, the teeth on the collar engaging the segment on the rock shaft, a ratchet wheel mounted upon the ratchet shaft engaging the pawl adapted to transmit motion to said shaft, means mounted on the ratchet shaft adapted to preclude movement of the ratchet shaft in any but a given direction, a second ratchet wheel mounted upon the ratchet shaft, a pawl operative upon the second mentioned ratchet wheel, and means mounted upon the ratchet shaft controlling the means adapted to render the drive shaft inoperative upon the driven shaft.

16. In a skip mechanism of the class described the combination of a drive shaft, a driven shaft, means adapted to transmit motion from the drive shaft to the driven shaft, means to render the drive shaft inoperative upon the driven shaft, a rock shaft operatively connected with the drive shaft, a segment mounted on the rock shaft, a ratchet shaft, a collar revolubly mounted upon the ratchet shaft and carrying a pawl, and a mutilated gear segment, the teeth on the collar engaging the segment on the rock shaft, a ratchet wheel mounted upon the ratchet shaft engaging the pawl adapted to transmit motion to said shaft, a cam mounted on the ratchet shaft and a bell crank lever engaging the cam shaft and controlling the transmission of motion through the means adapted to transmit motion from the drive shaft to the driven shaft.

17. In a machine of the class described the combination of a conveyer, a reciprocating hopper, means for movement with and communicating with the hopper adapted to be reciprocated relative to the hopper and over the conveyer, to withdraw from the hopper charges of dough, and to discharge the charges of dough upon the conveyer, and means to vary the relative individual discharges from the first mentioned means.

18. In a machine of the class described the combination of a conveyer, a hopper, means communicating with the hopper adapted to be reciprocated over the conveyer and to withdraw charges of dough from the hopper, and means to discharge certain charges of dough upon the conveyer during the movement of the reciprocating means in one direction and to discharge certain other charges of dough upon the conveyer during the movement of said reciprocating means in an opposite direction.

19. In a machine of the class described the combination of a conveyer, a hopper, means communicating with the hopper adapted to be reciprocated over the conveyer and to withdraw charges of dough from the hopper, and means to discharge certain of the charges of dough upon the conveyer during one portion of the cycle of the reciprocating means and to discharge other of the charges during a different portion of the cycle of the reciprocating means.

20. In a machine of the class described, the combination of a conveyor, dough discharge means above the conveyor, means to reciprocate the dough discharge means longitudinally and vertically of the conveyor, means adapted to feed a charge from the dough discharge means upon the conveyor during any portion of the cycle of the discharge means, and means for rendering the dough discharge means inoperative for a given period after a determinable number of deposits have been made therefrom.

21. In a cake forming and depositing machine the combination of a hopper, means for feeding a pan beneath the hopper, a die reciprocally carried by the hopper adapted to receive charges of dough from the hopper, plungers adapted to draw a charge of dough from the hopper, and to deposit it upon the pan, means adapted to reciprocate the hopper, and means adapted to actuate the plungers to draw a charge of dough into the die on the backward movement of the hopper and to discharge the charge of dough from the die upon the pan on the forward movement of the hopper.

22. In a machine of the character described the combination of a continuously moving conveyor for pans, a hopper above the conveyor, a die or cake forming means mounted for reciprocation relative to the hopper and comprising a hollow casing, plungers for alternate drawing of charges from the hopper into the casing and discharging of the casing, and means for reciprocating said die and hopper longitudinally of the conveyor, said reciprocating means adapted to move the hopper and die in substantial unison with the conveyor when the hopper, die and conveyor are moving in the same direction.

23. In a machine of the character described the combination of a continuously moving conveyor for pans, a hopper above the conveyor, a die or cake forming means reciprocally mounted on the hopper, means for reciprocating the hopper and die longitudinally of the conveyor, said reciprocating means adapted to move the hopper and die in one direction in substantial unison with the conveyor, and means for cooperating with said hopper and die for depositing cakes on pans carried by the conveyor.

24. In a machine of the character described the combination of a conveyor, a hopper above the conveyor, means to reciprocate the hopper longitudinally of the conveyor, said reciprocating means adapted to move the hopper in one direction in substantial unison with the conveyor, means to feed successive evenly spaced charges of dough from the hopper to the conveyor, and means for modifying the space between successive deposits after a determinable number of equally spaced deposits have been made.

25. In a machine of the character described, the combination of a conveyor, a hopper reciprocally mounted above the conveyor, and comprising vertically reciprocating discharge means, means for reciprocating the hopper longitudinally of the conveyor, said means adapted to move the hopper in one direction in substantial unison with the conveyor, means for discharging deposits of dough from the hopper and vertically reciprocating dough discharge means upon the conveyor, said last mentioned means adapted for effecting successive evenly spaced deposits upon the conveyor, and means for periodically rendering the hopper and vertically reciprocating discharge means inoperative for modifying the space between successive deposits after a determinable number of equally spaced deposits have been made.

26. In a cake forming and depositing machine the combination of a hopper, a conveyor passing beneath the hopper, a die communicating with the hopper, the die having an internal chamber and a duct for establishing communication between the chamber and the hopper, the die adapted for movement relative to the hopper alternately placing the duct in and out of communication with the hopper, plungers adapted to draw a charge of dough from the hopper into the die when the duct communicates with the hopper, and to exert pressure upon the charge of dough when the duct is out of communication with the hopper for moving the dough from the die for making a deposit upon the conveyor, means for reciprocating the hopper and die whereby the hopper and die may move with the conveyor in one direction, and means for actuating the plungers to draw a charge of dough into the die on the movement of the hoppers and die in a direction opposite to the direction of movement of the conveyor, and to discharge the charge of dough from the die upon the conveyor upon movement of the hopper and die with the conveyor.

27. In a machine of the character described the combination of a conveyor, a hopper above the conveyor, and comprising a die mounted on the hopper for vertical reciprocation upon the hopper, the die adapted to discharge upon the conveyor, and means to reciprocate the hopper longitudinally of the conveyor and the die vertically of the hopper.

28. In a machine of the character described the combination of a conveyor, a hopper above the conveyor, and comprising a die mounted on the hopper for vertical reciprocation upon the hopper, the die adapted to discharge upon the conveyor, means to reciprocate the hopper longitudinally of the conveyor and the die vertically of the hopper, and means for effecting successive evenly spaced deposits upon the conveyor and for modifying the space between successive deposits after a determinable number of equally spaced deposits have been made.

29. In a machine of the character described the combination of a horizontal conveyor, a slidably mounted hopper above the conveyor and adapted for reciprocation in a fixed plane above the conveyor, a vertical reciprocating die carried by the hopper and adapted for movement horizontally with the hopper for independent vertical reciprocation, the die and hopper arranged for communication one with the other, and means for reciprocating the hopper and die in unison and independently and for withdrawing charges of dough from the hopper into the die and for discharging the charges of dough from the die upon the conveyor.

30. In a cake forming and depositing machine the combination of a hopper, means to horizontally reciprocate the hopper, a die mounted on the hopper for reciprocation at an angle to the line of reciprocation of the hopper and means adapted to draw charges of dough from the hopper into the die during the return movement of the hopper and adapted to feed charges of dough from the die during the forward movement of the hopper.

31. In a cake forming and depositing machine the combination of a hopper, means adapted to reciprocate the hopper, a die reciprocally mounted on the hopper, means adapted to draw charges of dough from the hopper into the die during return movement of the hopper and adapted to feed the charges of dough from the die during the forward movement of the hopper.

32. In a machine of the character described for operation on dough, the combination of a longitudinally continuously moving conveyor, a hopper above the conveyor, and comprising means for operation on dough and for discharging dough deposits, and means to reciprocate the hopper longitudinally of the conveyor and in substantial unison with the conveyor when moving the hopper in the direction of movement of the conveyor.

33. In a dough working machine of the character described the combination of a continuously moving conveyor for pans, a hopper above the conveyor and comprising a die for discharging dough upon pans supported by the conveyor, and means for reciprocating the hopper in parallelism with the conveyor and for actuating the hopper in substantial unison with the conveyor during the operation of the die for discharging upon a pan.

34. In a cake forming and depositing machine comprising a hopper, means for feeding continuously a pan beneath the hopper, means adapted to move the hopper in approximate unison with the pan, means for feeding a charge of dough from the hopper onto the pan during the movement in unison, and means for moving the hopper in the opposite direction to a position for depositing the next row of pieces of dough upon the pan.

35. In a machine of the character described the combination of a conveyor for pans, a hopper above the conveyor for discharging upon the pans, means for reciprocating the hopper longitudinally of the conveyor in substantial unison therewith, and means to preclude discharge from the hopper for a given period after a determinable number of deposits have been made from the hopper.

36. In a machine of the character described the combination of a conveyor, a hopper above the conveyor, a die carried by the hopper for movement with the hopper, means for regularly reciprocating the hopper longitudinally of the conveyor and for discharging the die upon the conveyor and means for intermittingly rendering the die inoperative without affecting the regular reciprocation of the hopper.

In testimony whereof, I have hereunto subscribed my name this 17th day of February, 1920.

JOEL MOORES.